United States Patent
Marzocchi

[11] 3,837,897
[45]* Sept. 24, 1974

[54] GLASS FIBER REINFORCED ELASTOMERS

[75] Inventor: Alfred Marzocchi, Cumberland, R.I.

[73] Assignee: Owens-Corning Fiberglas Corporation, Toledo, Ohio

[ * ] Notice: The portion of the term of this patent subsequent to Dec. 5, 1989, has been disclaimed.

[22] Filed: May 4, 1972

[21] Appl. No.: 250,391

[52] U.S. Cl....... 117/72, 117/126 GN, 117/126 GQ, 117/126 GS, 117/161 ZA, 260/3, 260/9, 260/292 M, 260/29.3, 260/29.6 NR, 260/448.2 B, 260/448.2 N, 260/826 260/46.5 E

[51] Int. Cl. .... B32b 17/04, C08g 31/24, C07f 7/02

[58] Field of Search 117/126 GN, 126 GS, 126 GQ, 117/161 ZA, 72; 260/46.5 E, 448.2 N

[56] References Cited
UNITED STATES PATENTS

| | | | |
|---|---|---|---|
| 2,544,668 | 3/1951 | Goekel et al. | 260/438.5 |
| 3,022,196 | 2/1962 | Jenkins et al. | 260/46.5 E |
| 3,038,875 | 6/1962 | Boyer et al. | 260/46.5 E |
| 3,137,720 | 6/1964 | Cooper | 260/448.2 B |
| 3,328,450 | 6/1967 | Plueddemann | 260/448.8 R |
| 3,369,926 | 2/1968 | Eakins | 117/126 GS |
| 3,391,052 | 7/1968 | Morzocchi | 161/176 |
| 3,413,186 | 11/1968 | Morzocchi | 161/176 |
| 3,451,886 | 6/1969 | Eakins | 161/93 |
| 3,508,990 | 4/1970 | Marzocchi | 161/176 |
| 3,545,909 | 12/1970 | Gagliardi | 117/126 GS |
| 3,702,798 | 11/1972 | Shannon | 117/126 GS |
| 3,705,075 | 12/1972 | Morzocchi | 117/126 GQ |

*Primary Examiner*—William D. Martin
*Assistant Examiner*—William H. Schmidt
*Attorney, Agent, or Firm*—Carl G. Staelin; John W. Overman; Keith V. Rockey

[57] ABSTRACT

Improvements in the bonding relationship between glass fibers and elastomeric materials wherein glass fibers are treated with a composition containing as the essential component a copolymer of an amino silane and a resorcinolato silane. Alternatively, the glass fibers can also be treated with a composition formulated of an elastomer and a resorcinol formaldehyde resin prepared in the presence of a copolymer of an amino silane and a resorcinolato silane. The resulting composition and glass fibers treated therewith are used for reinforcement of elastomeric materials.

17 Claims, 3 Drawing Figures

GLASS FIBER REINFORCED ELASTOMERS

This invention relates to glass fiber-elastomeric products, and more particularly to the treatment of glass fibers and compositions in the treatment of glass to facilitate the combination of glass fibers with elastomeric materials such as the manufacture of glass fiber-reinforced elastomeric products.

The term "glass fibers," as used herein is intended to refer to and include (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarn that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

As used herein, the term "elastomer" is intended to mean and include natural rubber in the cured or uncured stage, vulcanized or unvulcanized stage, and synthetic organic elastomeric materials such as nitriles, acrylics and esters and terpolymers thereof with styrene and acrylonitriles; styrene and vinyl pyridine; and synthetic rubbers as represented by butadiene polymers and copolymers with monoolefins such as butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2–12 carbon atoms, and polysulfone rubbers.

It is now well known to combine glass fibers with elastomeric materials in the manufacture of glass fiber-reinforced elastomeric products, such as driving belts, timing belts, pneumatic tires, etc. One of the problems which has been encountered in such combinations of glass fibers with elastomeric products is the problem of securely anchoring the glass fiber surfaces to the elastomeric material in which the glass fibers are distributed. It is believed that this problem stems in part from the fact that the glass fibers are completely smooth, rod-like members and in part from the fact that the glass fiber surfaces are highly hydrophilic in nature, thereby resulting in the formation of a thin but tenacious film of moisture on the glass fiber surfaces which serves to destroy any bond, chemical or physical, which would otherwise be formed between the glass fiber surfaces and the elastomeric material with which the glass fibers are combined.

To minimize the problems of bonding the glass fiber surfaces to the elastomeric materials, it has been the practice in the manufacture of glass fiber-reinforced elastomeric products to make use of glass fibers in the form of individual glass fibers having a coating on the surfaces thereof to intertie the individual glass fibers to the elastomeric material in which the glass fibers are distributed, or preferably glass fibers in the form of yarns, cords or fabrics, hereinafter referred to as bundles, containing an impregnant therein which also serves to intertie the glass fiber bundles to the elastomeric material in which the bundles are distributed.

In efforts to further improve the bonding relationship between glass fibers and elastomeric materials, it has been the practice to make use of glass fiber coupling or anchoring agents, usually in the form of an organo silicon compound or a Werner complex compound formed of a complex of a chromium and an organic carboxylato group. One of the most preferred groups of glass fiber anchoring agents are the amino silanes as represented by gamma-aminopropyltriethoxy silane, which can be formulated into glass fiber size compositions for application as a coating on the individual glass fiber filaments or into glass fiber impregnating compositions for application as an impregnant in bundles of glass fibers.

In either case, the amino silane serves to provide a greater bonding relationship between glass fibers and elastomeric materials with which the glass fibers are combined.

It is an object of the present invention to provide coupling agents for use in the treatment of glass fibers to provide even greater bonding between glass fibers and elastomeric materials.

It is a more specific object of the invention to provide improved coupling agents which can be applied to glass fibers as a size, in forming or afterwards, to improve the processing and performance characteristics of glass fibers as reinforcement for elastomeric materials, and which can be applied as part of an impregnant in the treatment of strands, yarns, cords and fabrics, hereinafter called bundles in the manufacture of glass fiber-reinforced elastomeric materials.

It is a further object of the invention to provide compositions for use in the treatment of glass fibers in the form of individual filaments or in the form of bundles of glass fibers to further improve the bonding relationship between glass fibers and elastomeric materials.

These and other objects and advantages of the invention will appear more fully hereinafter, and for purposes of illustration but not of limitation, an embodiment of the invention is shown in the accompanying drawing in which.

Figure 1:
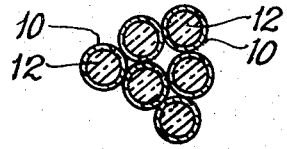
FIG. 1 is a cross sectional view of glass fibers treated in accordance with one embodiment in which the glass fibers are coated with the composition of the invention as a size coating.

The concepts of the present invention reside in an improved glass fiber anchoring or coupling agent in the form of a copolymer of an amino silane and a resorcinolato silicon compound. It has been found that copolymers of an amino silane and a resorcinolato silane are particularly effective in promoting a strong bonding relationship between glass fibers and elastomeric materials in the manufacture of glass fiber-elastomeric products such as drive belts, pneumatic tires and the like.

As the amino silane for use in forming the copolymer of the present invention, use is preferably made of an amino silane containing 1 to 3 readily hydrolyzable groups (e.g., halogen such as Cl or Br or lower alkoxy such as methoxy, ethoxy, propoxy, butoxy, etc.) and containing at least one organic group containing 2 to 10 carbon atoms substituted by at least one amino group and bonded directly to the silicon atom, with any remaining valences being taken up by hydrogen.

Preferred amino silanes are those of the formula

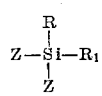

(I)

wherein R is an amino substituted organic group, Z is a readily hydrolyzable group described above and $R_1$ is an amino substituted organic group, a readily hydrolyzable group, or an organic group containing 1 to 6 carbon atoms (e.g. $C_1$ to $C_6$ alkyl, $C_2$ to $C_6$ alkenyl, etc.).

Preferred substituted amino groups include amino alkyl groups containing 2 to 10 carbon atoms (e.g., aminoethyl, aminopropyl, aminobutyl, aminopentyl, etc.), aminoalkenyl containing 2 to 10 carbon atoms (e.g. aminovinyl, aminoallyl, etc.), and amino substituted aromatic groups such as aminophenyl.

Representative of such amino silanes are the following:

Beta-aminoethyltrichloro silane silane
Gamma-aminopropyltrimethoxy silane
Delta-aminobutylethyldiethoxy silane
P-aminophenyltrichloro silane
Bis-(gamma-aminopropyl)diethoxy silane
Beta-aminovinyltrimethoxy silane
Gamma-aminoallyltriethoxy silane
Gamma-aminopropylvinyldiethoxy silane As the resorcinolato silicon compound for use in forming the copolymers of the present invention, use is preferably made of the resorcinolato silanes described in my earlier copending application Ser. No. 98,813, filed Dec. 16, 1970 now U.S. Pat. No. 3,705,075, the disclosure of which is incorporated herein by reference. One group of silanes disclosed in my copending applications are those in which a resorcinol group is bonded directly to the silicon atom, and have the formula

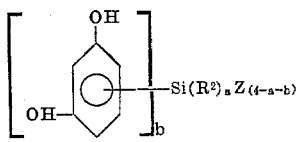

(II)

and those in which the resorcinol group is bonded to a silicon atom through an alkylene group. These latter compounds have the formula

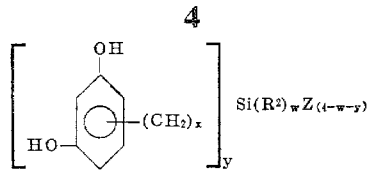

(III)

In the foregoing formulas $b$ and $y$ are integers from 1 to 3, $R^2$ is an organic group other than resorcinol, or hydrogen, $x$ is an integer from 1 to 4, $a$ and $w$ are zero or integers from 1 to 2 and Z is as described above.

For further description of these compounds and their preparation, reference can be made to the foregoing copending application.

Representative of resorcinolato silicon compounds include the following:

2,4-dihydroxyphenyltrichloro silane, 2,4-hydroxyphenyltriethoxy silane, 2,4-dihydroxy silane, 2,4-dihydroxyphenylvinyldichloro silane, 2,4-dihydroxyphenylallyldiethoxy silane, 2,4-dihydroxyphenylbenzyldimethoxy silane, 2,3-dihydroxyphenyl-p-aminophenyldimethoxy silane, 2,4-dihydroxyphenyl-3-aminopropyldimethoxy silane, 2,4-dihydroxyphenyl-3-glycidoxy-propyldiethoxy silane, 2,4-dihydroxyphenylcyclohexyldichloro silane, 2,4-dihydroxyphenyl-gamma-aminoallyldiethoxy silane, bis(2,4-dihydroxyphenyl)dichloro silane, tris(2,4-dihydroxyphenyl)monochloro silane, bis(2,4-dihydroxyphenyl)ethoxy silane, 2,4-dihydroxyphenyldichloro silane, 2,6-dihydroxyphenyldimethoxy silane, 2,6-dihydroxyphenylvinyldichloro silane, 2,6-dihydroxyphenyl-2-aminoethyldimethoxy silane, 2,4-dihydroxybenzyltrichloro silane, 2,6-dihydroxybenzyltribromo silane, 2,4-dihydroxybenzyltrimethoxy silane, 2,4-dihydroxybenzylmethyldichloro silane, 2,6-dihydroxybenzylpropyldimethoxy silane, 2,4-dihydroxybenzylvinyldichloro silane, 2,6-dihydroxybenzylallyldimethoxy silane, 2,4-dihydroxybenzylphenyldichloro silane, 2,4-dihydroxybenzyl-gamma-aminopropyldiethoxy silane, 2,6-dihydroxybenzylcyclorpentyldichloro silane, bis(2,4-dihydroxybenzyl)dichloro silane, bis(2,6-dihydroxybenzyl)chloro silane, tris(2,4-dihydroxybenzyl)ethoxy silane and bis(2,4-dihydroxybenzyl)ethylchloro silane.

The copolymers of the present invention can be prepared by conventional techniques for the polymerization of organo silanes. It is usually the practice to contact an amino silane and a resorcinolato silane in an inert solvent in the presence of controlled amounts of water. The rate of the reaction can be accelerated by heating, if desired, to a temperature up to the boiling point of the reaction mixture. It is generally preferred to use temperatures not in excess of 200°C. for most cases.

The relative proportions of the amino silane and the resorcinolato silane can generally be varied within wide ranges. For reasons of economy, it is usually preferred to make use of 30 to 90 mole percent, and most preferably 35 to 75 mole percent, of the amino silane.

Depending upon their molecular weight, the copolymers used in the practice of the present invention can have a number of configurations. The simplest form is the disiloxane which may be illustrated as follows

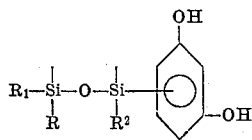

(IV)

or

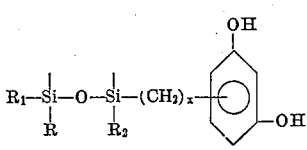

(V)

In the foregoing, the resorcinolato silane is one in which $a$ and $w$ are one. If $a$ and $w$ are zero, the dimer becomes

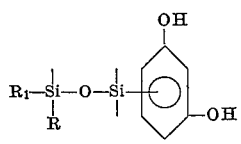

(VI)

and

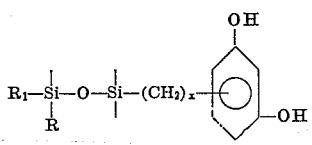

(VII)

The remaining valences of (IV) through (VII) above are bonded to the hydrolyzable groups Z or to OH groups, depending on the amount of water used in the polymerization.

In most cases, the copolymers have a more complex structure and include cyclic configurations such as

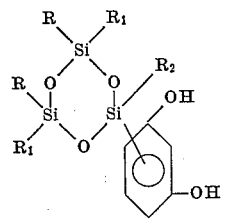

(VIII)

and

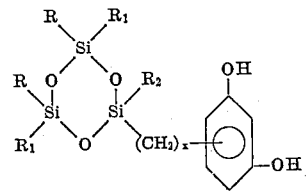

(IX)

as well as cyclic structures having a greater number of siloxane groups in the nucleus.

It is also believed that the siloxane copolymers are in the form of linear siloxanes which contain the siloxane group from the amino silane

(X)

and one of the siloxane groups from the resorcinolato silane

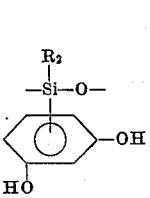  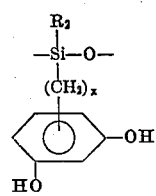

(XI)  (XII)

As indicated, the configuration of the copolymers used in the practice of the invention depends upon the amount of water used in the copolymerization. Most generally, the copolymers preferred for use in the invention have average molecular weights ranging up to 2,000, and preferably up to 1,500. The molecular weights of the polymers can be controlled to within this range by the use of from 1 to 20 moles of water per mole of hydrolyzable groups in each of the amino silane and the resorcinolato silane.

In accordance with one form of the present invention, the anchoring agents of the present invention are applied to individual glass fibers as a thin size coating on the surfaces thereof. Application of the copolymer anchoring agents of the invention can conveniently be effected by dissolving the copolymer in aqueous medium for coating of glass fibers, preferably in forming, or afterwards. The copolymers of the invention provide the desired lubricity for the glass fibers, without destroying their fibrous characteristics to improve the abrasion resistance of the glass fibers and prevent destruction of the glass fibers from mutual abrasion during subsequent processing. In addition, the coating formed from the copolymers of the invention serves to enhance the bonding relationship between the treated glass fibers and elastomeric materials with which they are combined in the manufacture of glass fiber reinforced elastomeric products.

The size composition containing the copolymers of the invention in aqueous medium can also be formulated, if desired, to include a binder of the type conventionally employed in glass fiber size compositions. Representative of such conventional binders include dextrinized starch and gelatin as well as synthetic polymeric materials such as polyvinyl alcohol, polyglycol condensates (e.g., polyethylene glycols), etc. As will be appreciated by those skilled in the art, any of the other film-forming binders of the type conventionally used in the prior art in glass fiber size compositions can similarly be used.

In addition to the film-forming binder, the size composition can also be formulated, if desired, to include any of the glass fiber lubricants and/or wetting agents to improve the processing characteristics of the size fibers and to improve the stability of the size composition.

In accordance with another form of the invention, the copolymer anchoring agents of the invention can be formulated into an impregnating composition for use as the impregnation of bundles of glass fibers which have preferably, but not necessarily, been sized. The anchoring agents of the invention serve to enhance the bonding relation between the impregnated bundles of glass fibers and elastomeric materials with which the impregnated bundles are combined.

Preferred impregnating compositions are those formed of a resorcinol-aldehyde resin component and an elastomer component. It has been found that the anchoring agents of the present invention which contain both a resorcinol functional group and an amino functional group are particularly effective with such impregnant systems. Suitable impregnants which can be used in the practice of the present invention are disclosed in copending application Ser. No. 398,305, filed Sept. 22, 1964 now abandoned, and U.S. Pat. Nos. 3,424,608 and 3,567,671.

Having described the basic concepts of the present invention, reference is now made to the following examples which are provided by way of illustration, and not by way of limitation, of the practice of the present invention.

EXAMPLE 1

This example illustrates the preparation of a copolymer for use in the present invention.

One mole of gamma-aminopropyltriethoxy silane and 2,4-dihydroxyphenyltriethoxy silane are dissolved in isopropanol; the solution is heated to a temperature of 75°C. and water is added in an amount (29 moles) to produce a copolymer having an average molecular weight of about 705.

The viscous copolymer is then separated from the reaction mixture.

EXAMPLE 2

This example illustrates the use of the copolymer of Example 1 in the treatment of glass fiber filaments in forming.

Using the procedure and apparatus as described in U.S. Pat. No. 3,424,608, a size composition formulated as follows:

| | |
|---|---|
| Copolymer of Example 1 | 1.5% by weight |
| Water | 98.5% by weight | is applied to glass fiber filaments in forming. The copolymer is found to form a thin coating 10 on the glass fiber filaments 12 (See FIG. 1).

EXAMPLE 3

Using the procedure described in Example 1, a copolymer having an average molecular weight of about 763 is prepared by hydrolyzing 1.5 moles delta-aminobutyltrimethoxy silane and 1.0 moles of 2,4-dihydroxybenzyltriethoxy silane. The viscous copolymer is separated from the reaction mixture and formulated into the following size composition:

| | |
|---|---|
| Copolymer | 1.5% by weight |
| Fatty acid amine wetting agent | 0.5% by weight |
| Water | 98.0% by weight |

The foregoing size composition can then be applied to glass fibers in accordance with the procedure of Example 2. In the application of such size composition, it is generally desirable that the dry size coating constitute from 1 to 12 percent by weight of the glass fibers.

EXAMPLE 4

Using the procedure described in Example 1, a siloxane copolymer having an average molecular weight of 882 is prepared from 2 moles of gamma-aminopropylvinyldiethoxy silane and 1 mole of 2,4-dihydroxyphenyltrimethoxy silane.

The copolymer is formulated into the following size composition:

| | |
|---|---|
| Siloxane copolymer | 2.0% by weight |
| Polyvinyl alcohol | 1.0% by weight |
| Fatty acid amine wetting agent (Nopcogen 16L) | 0.5% by weight |
| Water | 96.5% by weight |

EXAMPLE 5

The siloxane copolymer of this example is prepared by copolymerizing bis-(gamma-aminopropyl)diethoxy silane and 2,4-dihydroxybenzyltriethoxy silane. The copolymer has an average molecular weight of 1,131, and is formulated into the following size composition:

| | |
|---|---|
| Siloxane copolymer | 1.9% by weight |
| Partially dextrinized starch | 7.0% by weight |
| Cationic wetting agent (lauryl amine acetate) | 0.3% by weight |
| Non-ionic emulsifying agent | 0.2% by weight |
| Water | 90.6% by weight |

EXAMPLE 6

Using the procedure of Example 1, a siloxane copolymer having an average molecular weight of 1,222 is prepared from gamma-aminoallyltriethoxy silane and bis(2,4-dihydroxyphenyl)dimethoxy silane in a mole ratio of 2:1.

The copolymer is formulated into the following size composition:

| | |
|---|---|
| Siloxane copolymer | 2.3% by weight |
| Paraffin wax in aqueous emulsion | 0.2% by weight |
| Cationic amide polyester resin | 1.3% by weight |
| Polyethylene glycol($\overline{M}$ 300–400) | 2.3% by weight |
| Gelatin | 0.2% by weight |
| Water | 94.7% by weight |

Each of the compositions of Examples 4 to 6 can be applied to glass fibers as described in Example 2.

Glass fibers having a thin coating derived from the siloxane coupling agents of the invention can be combined with elastomeric materials in the manufacture of glass fiber reinforced elastomeric products. However, the glass fibers treated in accordance with the present invention are preferably subjected to further processing to form the glass fibers into strands, yarns, cords or fabrics, hereinafter referred to as bundles, and subjected to impregnation with a composition containing a resorcinol-aldehyde resin and an elastomer.

It has been found that the anchoring agents of the invention are particularly effective with such impregnant systems whereby the siloxane copolymers serve to securely integrate the impregnated bundles with elastomeric materials.

This concept of the invention may be illustrated by way of the following examples.

EXAMPLE 7

Glass fiber filaments which have been treated with the siloxane copolymer of Example 1 are formed into strands, and the strands are plied and twisted together to form a cord. The resulting cord or bundle is then impregnated with the following composition:

Impregnant Composition

| | |
|---|---|
| Resorcinol-formaldehyde resin natural rubber latex (38% solids — Lotol — U.S. Rubber Co.) | 35.0% by weight |
| Water | 65.0% by weight |

Figure 2:
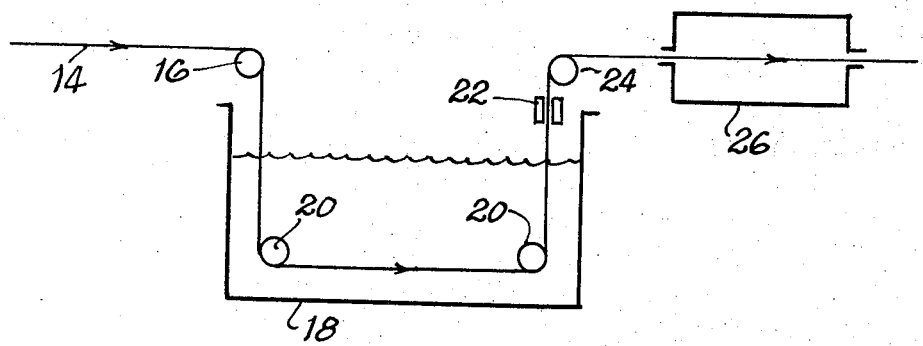
FIG. 2 is a schematic flow diagram illustrating the subsequent treatment of glass fibers which have been formed into bundles for impregnation of the glass fiber bundles.

Impregnating of the glass fiber bundle can be carried out by any conventional method. Referring now to FIG. 2 of the drawing as illustrative, the bundle 14 is advanced over a guide roller 16 for passage downwardly in a bath 18 containing the aqueous impregnant. The bundle is turned under a pair of rollers 20 in the bath to effect a sharp bend which operates to open the bundle to enable complete penetration of the impregnant into the bundle of sized fibers. The impregnated bundle is then raised from the bath for passage through a roller or die 22 which operates to remove excess impregnating composition from the bundle and to work the solids of the impregnant into the bundle.

Thereafter, the bundle is advanced over a roller 24 into a drying oven 26 to dry the bundle. Instead of drying, the impregnated bundle can be subjected to dielectric treatment to coagulate the latex with little or no drying.

Figure 3:
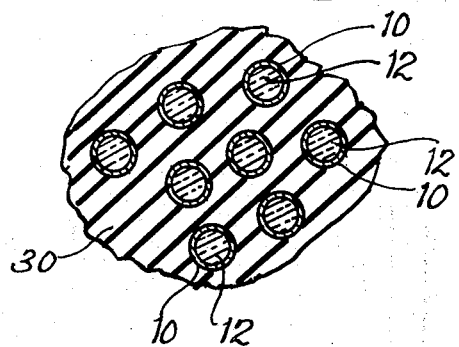
FIG. 3 is a cross sectional view of glass fibers treated in accordance with the method illustrated in FIG. 2.

The resulting bundle is shown in FIG. 3 of the drawing and is formed of a plurality of glass fibers 12 having a thin coating 10 formed from the siloxane copolymer anchoring agents of the invention. The impregnant 30 serves to completely fill the interstices between the sized glass fiber filaments and form a unitary bundle structure.

A suitable resorcinol-formaldehyde resin and blends thereof with natural rubber latex are marketed by the U.S. Rubber Company under the trade name "Lotol." For the preparation of these systems, reference can be made to Canadian Pat. No. 435,754 in which description is made of the reaction of resorcinol and formaldehyde in the presence of substantial amounts of short chained alkylamines for the purpose of stabilizing the reactions and the products produced therefrom, as well as a description of the combination of the resin with rubber latex. For further description of resorcinol-formaldehyde-elastomer systems, reference can be made to U.S. Pat. No. 3,591,357.

Various other impregnants formulated to contain a resorcinol-aldehyde resin component and an elastomer component may be used in place of the impregnant exemplified in Example 7. For example, use can be made of an impregnant composition of the type illustrated in U.S. Pat. No. 3,567,671, as represented by the following example.

EXAMPLE 8

Impregnating Composition

| | Parts by Weight |
|---|---|
| Vinyl pyridine-butadiene-styrene terpolymer latex (42% solids) (Gentac-General Tire and Rubber Co.) | 20–60 |
| Resorcinol-formaldehyde resin | 2–10 |
| Vinyl chloride-vinylidene chloride copolymer latex (Dow latex 874) | 10–40 |
| Micro-crystalline wax | 5–30 |

The balance of the composition is water, and the amount of water is adjusted to provide a total solids content of 25 to 55 percent by weight.

In addition, use can also be made of impregnating compositions of the type described in U.S. Pat. No. 3,424,608 in accordance with the concepts of the invention. Such composition can be formulated as follows:

EXAMPLE 9

Impregnating Composition

| | Parts by Weight |
|---|---|
| Resorcinol formaldehyde resin | 2–10 |
| Formaldehyde (37% solution) | 1–3 |
| Concentrated ammonium hydroxide | 2–5 |
| Vinyl pyridine terpolymer (42% solids) | 15–50 |
| Neoprene rubber latex (50% solids) | 25–50 |
| Butadiene latex (60% solids) | 5–15 |
| Alkali metal hydroxide | .05–0.2 |
| Water to solids of 25–55% | |

Application of the foregoing impregnating compositions can be made in accordance with the method described in Example 7 to deposit dry solids constituting from 5 to 25 percent by weight of the glass fiber system.

In accordance with a further concept of the invention, impregnating compositions of the type illustrated in Examples 7 to 9 can be modified to include a siloxane coupling agent and used in the treatment of glass fibers as a size or in the treatment of bundles of glass fibers as an impregnant. The siloxane anchoring agents of the invention continue to serve to enhance the bonding relation between the glass fibers and elastomeric materials with which the glass fibers are combined.

When use is made of the siloxane anchoring agents in such compositions, it is generally preferred to include a base to insure the stability of the system. Preferred are quaternary ammonium hydroxides such as tetramethyl ammonium hydroxide or tetraethanol ammonium hydroxide to maintain the pH of the composition on the alkaline side.

One such composition may be illustrated by the following example.

EXAMPLE 10

| | Parts by weight |
|---|---|
| Resorcinol-formaldehyde resin-natural rubber latex (38% solid) | 30.0 |
| Siloxane copolymer anchoring agent | .1–5 |
| Quaternary ammonium hydroxide | .01–3 |

The balance of the composition is water. When the composition is to be applied as a size to form a coating on the individual glass fiber filaments, it is generally preferred that the solids content be somewhat less than that for an impregnant, usually 20–40 percent by weight.

In accordance with another concept of the invention, the copolymers of the present invention may be formed into the matrix of a resorcinol-aldehyde resin system for use as the resorcinol-aldehyde resin component in the now well-known glass fiber treating compositions formulated of a resorcinol-aldehyde resin component and an elastomer component, as described in my copending application Ser. No. 250,303 filed concurrently herewith, the disclosure of which is incorporated by reference.

As described in the foregoing copending application, the silanized resorcinol-aldehyde resin is prepared by reacting resorcinol and a lower aliphatic aldehyde, and preferably formaldehyde, in the presence of a primary or secondary amine and in the presence of a copolymer of an amino silane and a resorcinolato silane of the present invention.

The reaction mixture generally contains 2 to 10 moles of aldehyde per mole of resorcinol, at least 1.3 moles of the amine per mole of resorcinol and preferably 1.3 to 15 moles of amine per mole of resorcinol and from 0.1 to 0.8 moles of the copolymer of amino silane and the resorcinolato silane per mole of resorcinol. The reaction is preferably carried at an alkaline pH over a wide range of temperatures as described in the foregoing application.

The following example will serve to illustrate the preparation of a modified resorcinol formaldehyde resin in accordance with this concept of the invention.

EXAMPLE 11

Using the copolymer of Example 1, a modified resorcinolformaldehyde resin is prepared as follows:

Solution A is prepared with the following composition:

| | |
|---|---|
| Resorcinol | 0.9 moles |
| Dimethyl amine (25% by weight aqueous solution) | 1.0 mole | and Solution B is prepared as follows:

| | |
|---|---|
| Dimethyl amine (25% aqueous solution) | 0.56 mole |
| Aqueous formaldehyde | 2.7 moles |
| Copolymer of Example 1 | 0.1 mole |

Solution B is cooled to about 5°C., and Solution A is added thereto, with stirring, while maintaining the reaction termperature below 25°C. After stirring the cooling is stopped, and the reaction mixture is allowed to reach room temperature. It is found that the resulting brown solution will resinify within 5 to 10 hours.

As described in my copending application, the solution can then be blended with an alkaline elastomer latex to form a glass fiber treating composition as illustrated by the following example.

EXAMPLE 12

Prior to resinification of the reaction mixture of Example 11, the brown solution is blended with a natural rubber latex to form the following composition:

| | Parts by Weight |
|---|---|
| Natural rubber latex (60% solids) | 100 |
| Anti-oxidant | 1.0 |
| Vulcanizing agent | 4.0 |
| Modified resorcinol-formaldehyde resin | 15.0 |

It is found that the addition of the resin solution to the elastomer latex results in neither the precipitation of the resin nor coagulation of the latex, and the resulting composition is quite stable.

The composition can be applied to the surfaces of individual glass fiber filaments to form a coating thereon, but is preferably applied as an impregnant in a glass fiber bundle formed of sized or unsized glass fibers as described in my copending application.

While natural rubber latices are preferred for use in the practice of the invention, use can also be made of other alkaline elastomer latices such as alkaline latices of neoprene, butadiene, butadiene-styrene, butadiene-styrene-acrylonitrile, vinyl pyridine-butadiene-styrene, etc. elastomers. It is generally sufficient to make use of 5 to 40 parts by weight resin per 100 parts by weight of the elastomer. If desired, the elastomer component may include conventional vulcanizing agents (e.g., sulfur, zinc oxide, etc.) and/or anti-oxidants and other rubber additives.

In the final system, the elastomeric material with which the treated glass fibers or impregnated bundles of glass fibers are combined constitutes a continuous phase. This continuous phase of elastomeric material may comprise rubbers of the type employed in the treating compositions, or the elastomer may differ therefrom. The continuous phase elastomeric material may be employed in the cured or uncured state or in the vulcanized or unvulcanized state. It is believed that the tie-in between the glass fibers and elastomeric material constituting the continuous phase occurs primarily during cure and/or vulcanization of the glass fibers in combination with the elastomeric material.

In fabricating the combinations of glass fibers treated in accordance with this invention, the glass fibers or bundles of glass fibers are mixed with elastomeric materials or otherwise laid down in the desired arrangement for combination with elastomeric material, such as in the manufacture of glass fiber reinforced belts or in the manufacture of rubber tires reinforced with cords of glass fibers. The combination of glass fibers and elastomeric material is then processed in a conventional manner by molding under heat and compression or by vulcanization.

It will be apparent that the invention resides not only in the glass fibers treated in accordance with the invention, but also in the compositions described and glass fiber-reinforced elastomeric products produced from fibers treated in accordance with the invention.

It will be understood that various modifications and changes can be made in the details of formulation, procedure and use without departing from the spirit of the invention, especially as defined by the following claims.

I claim:

1. Glass fibers having a thin coating thereon, said coating formed from a copolymer of 30 to 90 mole percent of an amino silane containing 1 to 3 readily hydrolyzable groups and at least one organic group having 2 to 10 carbon atoms which is substituted by at least one amino group, with the organic group bonded directly to the silicon atom, with any remaining valences being taken up by hydrogen, and 10 to 70 mole percent of a resorcinolato silane selected from the group consisting of a silane of the formula

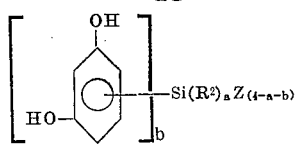

and a silane of the formula

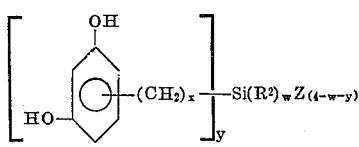

wherein $b$ and $y$ are integers from 1 to 3, $R^2$ is an organic group other than resorcinol or hydrogen, $a$ and $w$ are zero or integers from 1 to 2, $x$ is an integer from 1 to 4 and Z is a readily hydrolyzable group.

2. Glass fibers as defined in claim 1 wherein the coating includes a binder.

3. Glass fibers as defined in claim 1 wherein the coating includes a resorcinol-aldehyde resin and an elastomer.

4. A glass fiber bundle comprising a plurality of glass fibers and an impregnant in the bundles, the impregnant comprising a resorcinol aldehyde resin, an elastomer and a copolymer of 30 to 90 mole percent of an amino silane containing 1 to 3 readily hydrolyzable groups and at least one organic group having 2 to 10 carbon atoms which is substituted by at least one amino group, with the organic group bonded directly to the silicon atom, with any remaining valences being taken up by hydrogen, and 10 to 70 mole percent of a resorcinolato silane selected from the group consisting of a silane of the formula

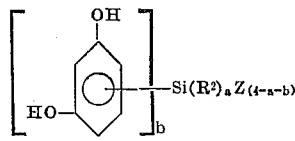

and a silane of the formula

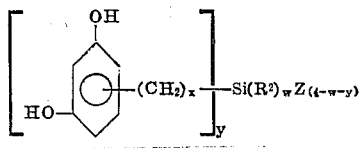

wherein $b$ and $y$ are integers from 1 to 3, $R^2$ is an organic group other than resorcinol or hydrogen, $a$ and $w$ are zero or integers from 1 to 2, $x$ is an integer from 1 to 4 and Z is a readily hydrolyzable group.

5. A glass fiber bundle as defined in claim 4 wherein the individual glass fibers forming the bundle have a size coating on the individual surfaces thereof.

6. A glass fiber bundle as defined in claim 4 wherein the glass fiber bundle is in the form of a plurality of strands plied together.

7. A glass fiber bundle as defined in claim 6 wherein the strands are plied and twisted together.

8. In a glass fiber bundle formed of a plurality of glass fibers containing an impregnant in the bundle comprising a resorcinol-aldehyde resin and an elastomer, the improvement comprising a thin coating on the surfaces of the individual glass fibers formed from a copolymer of 30 to 90 mole percent of an amino silane containing 1 to 3 readily hydrolyzable groups and at least one organic group having 2 to 10 carbon atoms which is substituted by at least one amino group, with the organic group bonded directly to the silicon atom, with any remaining valences being taken up by hydrogen and 10 to 70 mole percent of a resorcinolato silane selected from the group consisting of a silane of the formula

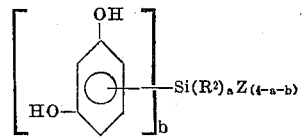

and a silane of the formula

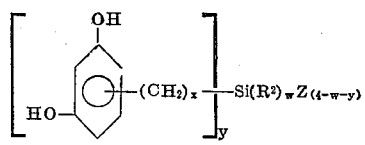

wherein $b$ and $y$ are integers from 1 to 3, $R^2$ is an organic group other than resorcinol or hydrogen, $a$ and $w$ are zero or integers from 1 to 2, $x$ is an integer from 1 to 4 and Z is a readily hydrolyzable group.

9. A glass fiber bundle as defined in claim 8 wherein the coating includes a lubricant and/or a binder.

10. A glass fiber bundle as defined in claim 8 wherein the glass fiber bundle is in the form of a plurality of strands plied together.

11. A glass fiber bundle as defined in claim 10 wherein the strands are plied and twisted together.

12. In a glass fiber-reinforced elastomeric product in which an elastomeric material constitutes a continuous phase in which the glass fibers are distributed, the improvement in the bonding relationship between the glass fibers and the elastomeric material comprising a coating on the glass fibers formed from a copolymer of 30 to 90 mole percent of an amino silane containing 1 to 3 readily hydrolyzable groups and at least one organic group having 2 to 10 carbon atoms which is substituted by at least one amino group, with the organic group bonded directly to the silicon atom, with any remaining valences being taken up by hydrogen, and 10 to 70 mole percent of a resorcinolato silane selected from the group consisting of a silane of the formula

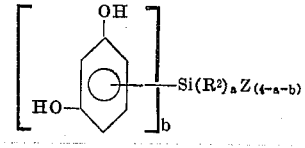

and a silane of the formula

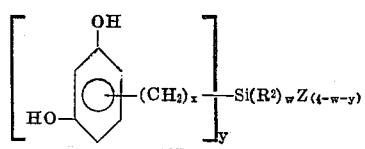

wherein $b$ and $y$ are integers from 1 to 3, $R^2$ is an organic group other than resorcinol or hydrogen, $a$ and $w$ are zero or integers from 1 to 2, $x$ is an integer from 1 to 4 and Z is a readily hydrolyzable group.

13. An elastomeric product as defined in claim 12 wherein the glass fibers are in the form of filaments and the coating constitutes a coating on the surfaces of the individual fiber filaments.

14. An elastomeric product as defined in claim 12 wherein the glass fibers are in the form of bundles of glass fibers, with the coating being an impregnant in the bundle and also containing a resorcinol-aldehyde resin and an elastomer.

15. An elastomeric product as defined in claim 14 wherein the bundles are formed of strands of glass fibers plied together.

16. An elastomeric product as defined in claim 15 where the strands are plied and twisted together.

17. An elastomeric product as defined in claim 12 wherein the glass fibers are in the form of bundles of glass fibers containing an impregnant therein, said impregnant comprising a resorcinol-aldehyde resin and an elastomer, with the coating being a size coating on the individual glass fiber surfaces.

* * * * *